UNITED STATES PATENT OFFICE.

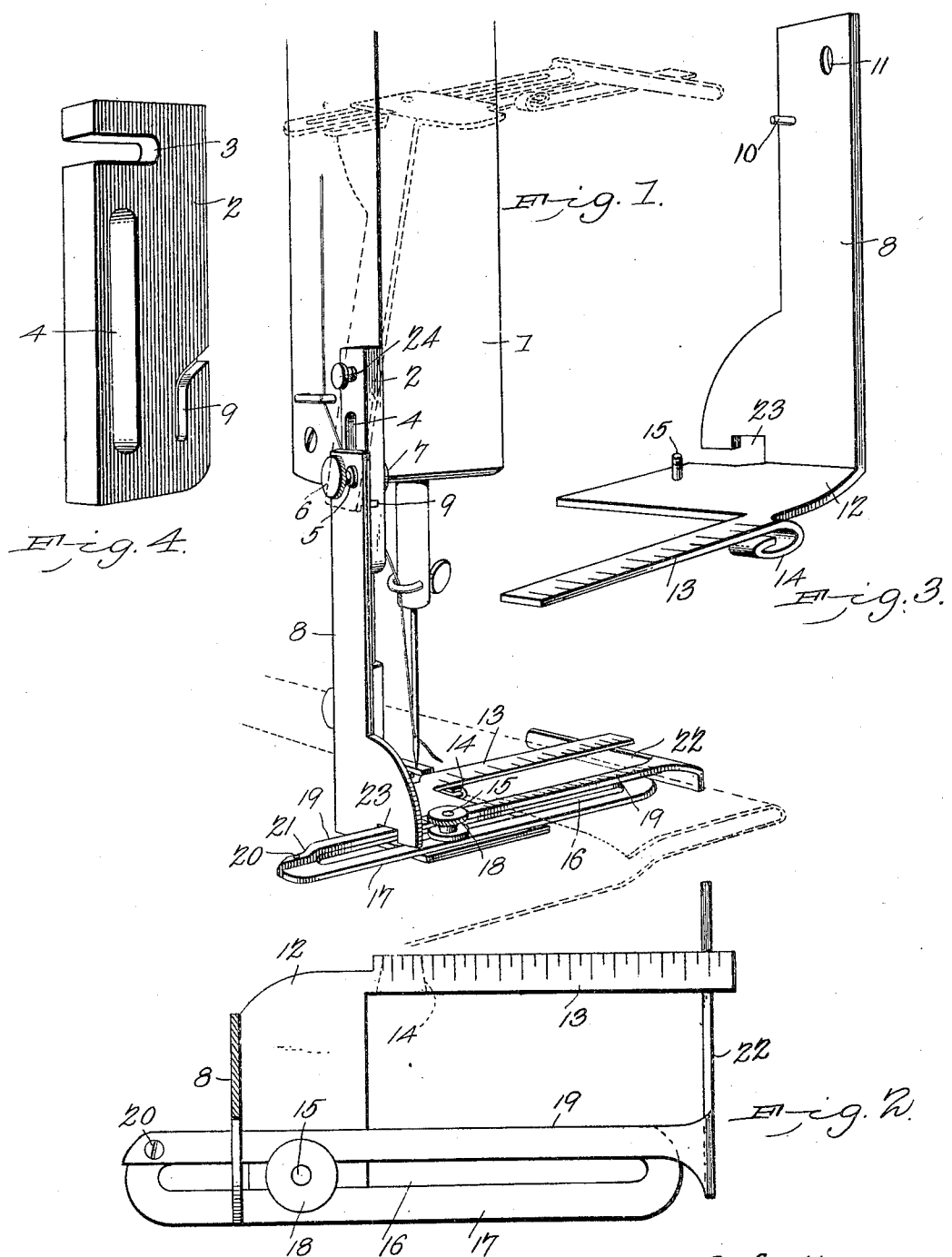

CHARLES FRANKLIN GOFORTH, OF WICHITA, KANSAS.

HEMMER ATTACHMENT FOR SEWING-MACHINES.

No. 798,277.      Specification of Letters Patent.      Patented Aug. 29, 1905.

Application filed October 25, 1902. Serial No. 128,808.

*To all whom it may concern:*

Be it known that I, CHARLES FRANKLIN GOFORTH, a citizen of the United States, residing at Wichita, in the county of Sedgwick and State of Kansas, have invented a new and useful Hemmer Attachment for Sewing-Machines, of which the following is a specification.

This invention relates to hemmer attachments for sewing-machines.

The object of the invention is in a ready, simple, practical, and thoroughly feasible manner to obviate the necessity of attaching the hemmer to the cloth-plate of the machine each time its use is required and of removing the presser-foot when hemming is to be done.

With these and other objects in view, as will appear as the nature of the invention is better understood, the same consists, generally stated, in a hemmer attachment provided with means for permanent connection with the head of a machine and adapted to be swung into and out of operative positions.

The invention consists, further, in a hemmer attachment provided with means for a permanent connection with the head of the machine and locking mechanism for holding it in operative position.

The invention consists, further, in the novel construction and combination of parts of a hemmer attachment for sewing-machines, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in perspective, exhibiting a portion of the head of a sewing-machine with the attachment of this invention associated therewith. Fig. 2 is a view in plan, partly in section. Fig. 3 is a perspective detail view of the lower member of the shank of the attachment. Fig. 4 is a similar view of the upper member of the shank.

Referring to the drawings, 1 designates the head of an ordinary sewing-machine, to the front side of which is secured the hemmer attachment. The attachment comprises a two-part shank, the upper member 2 of which is provided with a recess 3 to receive a thumb-screw to secure it to the machine-head. The lower terminal of the member 2 is provided near one edge with a slot 4, through which is adapted to pass a pin 5, having at one end a milled head 6, the pin being threaded into a disk or washer 7, disposed against the inner face of the member 2 to clamp the two shank members together and also to compensate for wear.

The member 2 is provided in one face, which will be the outer one in use and opposite the slot 4, with an angular locking-groove 9 approximately of the bayonet-slot type, which is designed to be engaged by a pin 10, carried by the lower member 8, the groove and pin being clearly shown in Figs. 3 and 4, the member 8 being further provided with an opening 11 to receive the pin 5.

The lower portion of the member 8 is provided with an extension 12, which extends at right angles to its length and has at its front a graduated gage-arm 13, at the inner terminal of which is arranged an edge-turner 14, which may be either integral with the gage-arm or secured thereto. This edge-turner is of the usual volute conical type and operates in a manner that will be readily understood to turn in the raw edge of the cloth. The extension 12 carries a threaded pin 15, which is adapted to project through a slot 16 in a gage-plate 17, a thumb-nut 18, carried by the pin, serving to hold the gage-plate at the desired adjustment upon the extension. Secured to the front edge of the gage-plate and parallel with the slot 16 is a resilient hem-width gage 19, one end of which is secured by a screw or rivet 20 or the like to the plate, the gage being bent at 21 to form a shoulder to hold it above the gage-plate and the free end of the gage being provided with a finger or arm 22, constituting a guide as well as a hem-gage. As the hem-width gage extends above the gage-plate, in order to permit lateral adjustment of the gage-plate the lower shank member 8 is provided with a recess 23, in which the hem-width gage is adapted to move, as clearly indicated by Figs. 1 and 3.

In assembling the attachment with the machine a thumb-screw 24 of any preferred construction is passed through the recess 3 of the upper shank member and rigidly clamps it to the machine-head.

When the attachment is in inoperative position, as indicated by dotted lines in Fig. 1, and it is desired to bring it to operative position for hemming purposes, the lower member is moved to bring the pin 10 into engagement with the groove 9 and is then drawn downward until the pin reaches the bottom of the groove, when the parts will be locked in operative position. When the hemmer is no longer to be used, the lower member is moved to clear the pin 10 from the groove 9, and the member may then be swung upward and backward against the machine-head.

In using the device the cloth is drawn over the gage-plate 17 and thence passes inward toward the edge-turner 14. As the gage-plate is adjustable it permits the formation of a hem of any width.

It will be seen from the foregoing description that although the device of this invention is exceedingly simple of construction it will be found thoroughly efficient and durable in use for the purpose designed and may be attached to any standard sewing-machine with which it is adapted to work without necessitating any change in the structural arrangement of the machine.

Having thus fully described the invention, what I claim is—

1. In a hemmer attachment for sewing-machines, a supporting-bar, a horizontally-disposed plate at the lower end of said bar, the bar being provided with a slot or opening, a gage-plate extending through said slot or opening, said gage-plate being provided with a longitudinal slot to permit adjustment, means for locking the gage-plate in adjusted position, a hem-width gage carried by said gage-plate and having at its outer end a strip or finger for preventing outward movement of the fabric, a graduated gage-arm carried by the plate, and an edge-turner arranged at the juncture of the plate and arm.

2. In a hemmer attachment for sewing-machines, a bar bent outward at its lower end to form a supporting-plate, said bar being slotted, a threaded pin carried by the plate, a gage-plate extending through the slot, and partly guided by the wall thereof, said gage-plate having a longitudinal slot for the passage of the threaded pin, a binding-nut arranged on the pin for clamping the gage-plate in adjusted position, a hem-width gage carried by the gage-plate, a downturned finger at the end of the hem-width gage for preventing outward movement of the cloth, a graduated gage-arm extending outward from the supporting-plate, and an edge-turner disposed at the juncture of the gage-arm and said plate.

In testimony that I claim the foregoing as my own I have hereto affixed my signature in the presence of two witnesses.

CHARLES FRANKLIN GOFORTH.

Witnesses:
  CHAS. E. LONGTON,
  A. E. JOBES.